United States Patent
Ghabra et al.

(10) Patent No.: US 7,896,391 B2
(45) Date of Patent: Mar. 1, 2011

(54) METHOD AND SYSTEM FOR DETECTING SEAT POSITION

(75) Inventors: Riad Ghabra, Dearborn Heights, MI (US); Pawel Sleboda, Bloomfield Hills, MI (US)

(73) Assignee: Lear Corporation, Southfield, MI (US)

( * ) Notice: Subject to any disclaimer, the term of this patent is extended or adjusted under 35 U.S.C. 154(b) by 685 days.

(21) Appl. No.: 11/845,267

(22) Filed: Aug. 27, 2007

(65) Prior Publication Data

US 2009/0058057 A1 Mar. 5, 2009

(51) Int. Cl.
*B60R 21/16* (2006.01)
(52) U.S. Cl. .......................... 280/735; 180/286; 701/45
(58) Field of Classification Search ................. 180/286; 280/733–735; 340/435, 457.1; 701/45–47
See application file for complete search history.

(56) References Cited

U.S. PATENT DOCUMENTS

| | | | | |
|---|---|---|---|---|
| 5,413,378 | A * | 5/1995 | Steffens et al. ............... | 280/735 |
| 5,804,887 | A * | 9/1998 | Holzapfel et al. ........... | 307/10.1 |
| 6,025,783 | A * | 2/2000 | Steffens, Jr. ................. | 340/644 |
| 6,142,524 | A * | 11/2000 | Brown et al. ................ | 280/806 |
| 6,170,866 | B1 * | 1/2001 | Popp et al. ................... | 280/735 |
| 6,206,416 | B1 * | 3/2001 | Faigle et al. ................ | 280/735 |
| 6,240,352 | B1 * | 5/2001 | McCurdy ..................... | 701/45 |
| 6,362,734 | B1 * | 3/2002 | McQuade et al. .......... | 340/457.1 |
| 6,906,612 | B2 | 6/2005 | Ghabra et al. | |
| 6,933,655 | B2 | 8/2005 | Morrison et al. | |
| 7,002,457 | B2 | 2/2006 | Stevenson et al. | |
| 7,005,976 | B2 * | 2/2006 | Hagenbuch ............... | 340/457.1 |
| 7,103,460 | B1 | 9/2006 | Breed | |
| 7,209,033 | B2 * | 4/2007 | Hofbeck et al. ........... | 340/457.1 |
| 7,555,380 | B2 * | 6/2009 | Maue et al. .................. | 701/49 |
| 7,560,827 | B2 * | 7/2009 | Jacas-Miret et al. ......... | 307/9.1 |
| 7,639,125 | B2 * | 12/2009 | Federspiel et al. ........ | 340/457.1 |
| 2005/0150705 | A1 | 7/2005 | Vincent et al. | |
| 2006/0125614 | A1 | 6/2006 | Hagenbuch | |
| 2006/0167595 | A1 | 7/2006 | Breed et al. | |
| 2006/0176158 | A1 * | 8/2006 | Fleming ................... | 340/425.5 |
| 2006/0273917 | A1 | 12/2006 | Rams, Jr. | |
| 2007/0096891 | A1 * | 5/2007 | Sheriff et al. ............. | 340/457.1 |
| 2007/0102999 | A1 * | 5/2007 | Darraba ..................... | 307/10.1 |
| 2007/0139185 | A1 * | 6/2007 | Nathan et al. ............... | 340/538 |
| 2007/0182535 | A1 * | 8/2007 | Seguchi .................... | 340/457.1 |

(Continued)

FOREIGN PATENT DOCUMENTS

DE 4327341 A1 * 2/1995

(Continued)

OTHER PUBLICATIONS

German Office Action for corresponding Application No. 10 2008 031 494.3, mailed Nov. 10, 2008, 4 pages.

*Primary Examiner*—Paul N Dickson
*Assistant Examiner*—Laura Freedman
(74) *Attorney, Agent, or Firm*—Brooks Kushman P.C.

(57) ABSTRACT

Seating positioning determining based on wireless signals. The seat positioning may include assessing seating location within a vehicle or other environment. The seat positioning may be used with various vehicle system to control their operation based on the seat positioning. The seat positioning inquiry may also include additional information, such as but not limited to seat identification information and seat safety system information.

17 Claims, 2 Drawing Sheets

U.S. PATENT DOCUMENTS

2007/0221428 A1* 9/2007 Strutz et al. .................. 180/268
2007/0241545 A1* 10/2007 Federspiel .................. 280/735
2008/0084290 A1* 4/2008 Hawkins .................. 340/457.1

FOREIGN PATENT DOCUMENTS

| | | |
|---|---|---|
| DE | 19959946 A1 | 7/2000 |
| DE | 69721815 T2 | 3/2004 |
| DE | 10341578 A1 | 4/2005 |
| DE | 102006042455 A1 | 8/2007 |
| WO | WO 9829283 A1 * | 7/1998 |

* cited by examiner

METHOD AND SYSTEM FOR DETECTING SEAT POSITION

BACKGROUND OF THE INVENTION

1. Field of the Invention

The present invention relates to detecting seat positioning.

2. Background Art

Vehicles and other passenger devices may include a number of seats. The seats may be removed from the vehicle and/or otherwise positionable within the vehicle. Various vehicle systems may control their operation according to the positioning of the seats within the vehicle, i.e., whether the seats are positioned within certain areas of the vehicle and/or whether the seats are positioned outside the vehicle (removed). As such, a need exists to provide the vehicle system with a capability to determine seat positioning.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
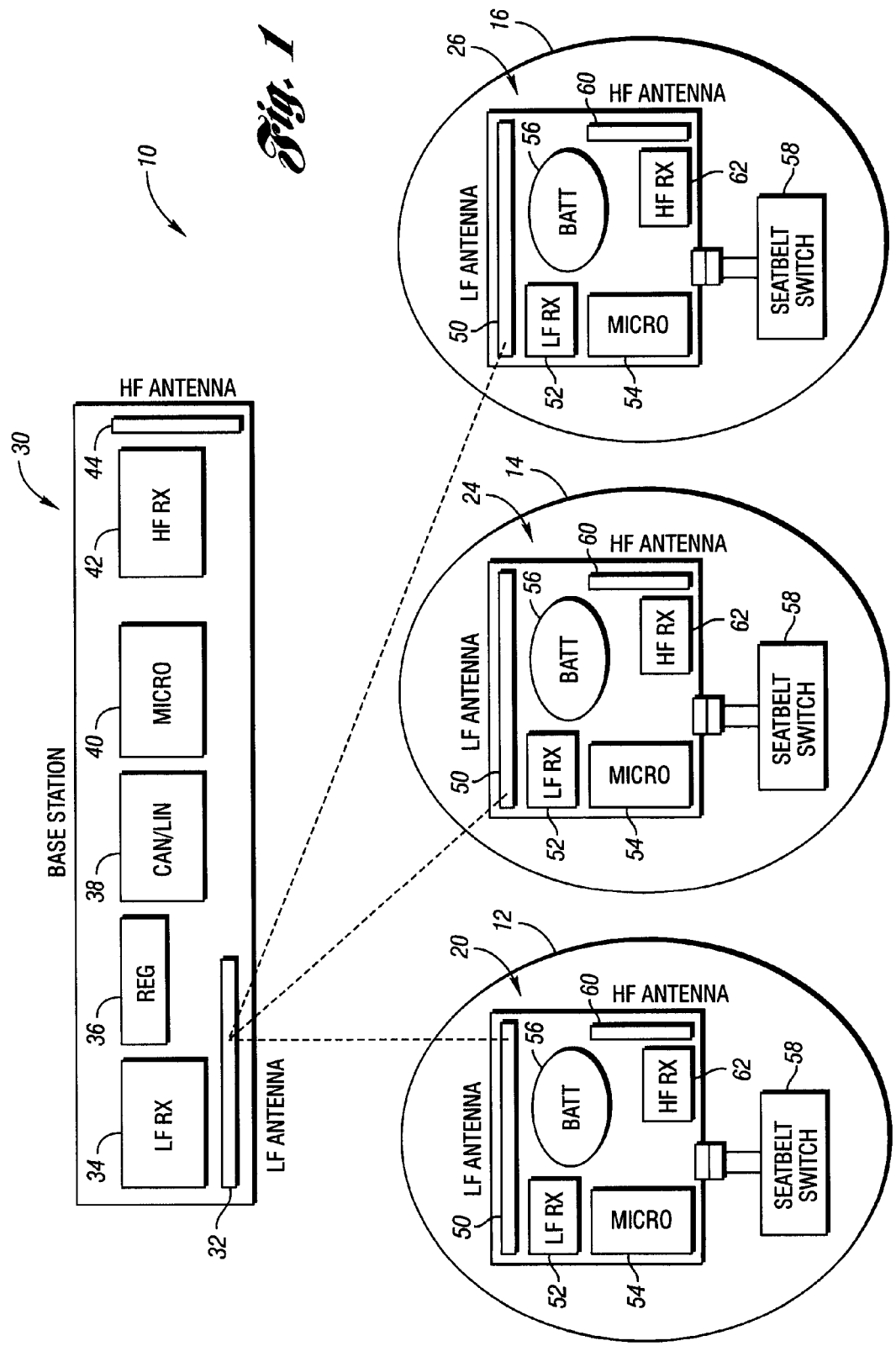
FIG. 1 illustrates a system for detecting seat position in accordance with one non-limiting aspect of the present invention.

FIG. 1 illustrates a system 10 for detecting seat position in accordance with one non-limiting aspect of the present invention. The system 10 may be adapted for use within a vehicle or other environment where seats (not shown) may be positioned within one or more areas, generally illustrated with circles 12, 14, 16. A seating device 20, 24, 26 may be included on each seat and configured in accordance with the present invention to facilitate assessing whether the seats are in either one of the areas 12, 14, 16.

The present invention contemplates the seating devices 20, 24, 26 to be attached to the seats such that they move with movement of the seats. With respect to automotive applications, the seats may be front driver or passenger seats, second row seats, bench seats, bucket seats, or any other kind of seat that may be included within the vehicle. For exemplary purposes only and without intending to limit the scope and contemplation of the present invention, the present invention is predominately described with respect to a second row of seats including three separate seats. The seats may be configured to fit within one or more of the areas 12, 14, 16 (each area 12, 14, 16 may include corresponding structures and features to secure the seats) and the seats may be removable for position in the one or more areas 12, 14, 16 and/or for removal from the vehicle.

A base station 30 may be included to facilitate determining the seat positioning. The base station 30 may be mounted within any area 12, 14, 16 of the vehicle and configured for wireless communications with the seat devices 20, 24, 26. The wireless communication between the seat devices 20, 24, 26 and the base station 30 may be used to facilitate determining the seat positioning. The present invention contemplates at least one method of determining the seat positioning as a function of signal strength associated with the wireless signals, i.e., based on signal strength associated with signal communicated to the seat devices 20, 24, 26, signal strength associated with signals communicated from the seating devices 20, 24, 26, and/or some combination thereof.

To facilitate the wireless communications, the base station 30 and the seating devices 20, 24, 26 may include any number of components and processing capabilities. The bases station 30 may include a low frequency antenna 32, a low frequency transmitter 34, a REG feature 36, a controller area network (CAN)/local interconnect network (LIN) feature 38, a microcontroller 40, a high frequency transmitter 42, and a high frequency antenna 44. Of course, the present invention is not intended to be limited to a base station 30 having only these elements and contemplates any suitable configuration for the base station 30, including configurations having more or less of these elements.

The low frequency antenna 32 may operate with the low frequency transmitter 34 to facilitate transmitting low frequency wireless signals. One low frequency wireless signal transmitted from the base station 30 may be a polling signal, which is described below in more detail. The polling signal my be broadcasted to each area 12, 14, 16 of the vehicle to facilitate assessing seating position. The high frequency antenna 44 may operate with the high frequency receiver 42 to facilitate receiving high frequency wireless signals. One high frequency wireless signal may be a seat latch signal received from the seating devices 20, 24, 26, which is described below in more detail.

The present invention contemplates the use of high frequency and low frequency signals to facilitate energy conservation. As one skilled in the art will appreciate, lower frequency signals require more energy for transmission than higher frequency signals while higher frequency signals required more energy for receiving than lower frequency signals. Any suitable frequency for either of the high frequency and low frequency signals, including the same frequency, may be used without deviating from the scope and contemplation of the present invention, however, the present invention contemplates sufficient energy conservation when the low frequency signals are approximately 20-140 kHz and the high frequency signals are approximately 300-450 MHz, but any range may be used.

Returning to the other features of the base station 30, the CAN/LIN feature 38 may be configured to facilitate communication with other vehicle systems over a bus and/or other network based communications. The microprocessor 40 may be configured to execute any number of logical operations required to execute or facilitate any operation required in accordance with the present invention. The REG feature 36 may be voltage regulator configured to facilitate powering the base station 30.

The seat devices 20, 24, 26 may include a low frequency antenna 50, low frequency receiver 52, a microprocessor 54, a battery 56, a seatbelt switch 58, a high frequency antenna 60, and a high frequency transmitter 62. The high frequency transmitter 62 and antenna 60 and the low frequency receiver 52 and antenna 50 may operate to facilitate receipt of the polling signal and transmission of the seat latch signal, as describe above. The microprocessor 54 may be configured in the manner describe above to support operations of the seating device.

The battery 56 may be configured to power the seating device. Energy consumption of the battery 56 may be conserved in accordance with the present invention through the above-described use of the low and high frequency wireless signals. The seating devices 20, 24, 26 may be configured to run solely off of battery power instead of a vehicle based energy supply, i.e., the seating devices 20, 24, 26 may be standalone devices which are never connected to the vehicle wire harness or other vehicle based power supply. The battery 56 may be non-rechargeable battery such that the energy conservation may be critical to longevity of the seating devices.

The seat belt switch 58 may be configured to assess whether a seat belt latch (not shown) associated with a seat belt system (not shown) of each seat is locked or unlocked. The seat belt latch may be considered to unlocked if the seat belts are disconnected and/or otherwise unable to restrain an occupant in the event of a collision or other sudden stop of the vehicle. The microprocessor 54 may communicate with the seat belt switch 56 to assess whether the seat belt latch is locked or unlocked and to store its status for use in accordance with the present invention. The seatbelt switch 56 may be any switch suitable for use in assess whether the seat belt latch is locked or unlocked or whether the seat belt system is otherwise unable to restrain an occupant.

Figure 2:
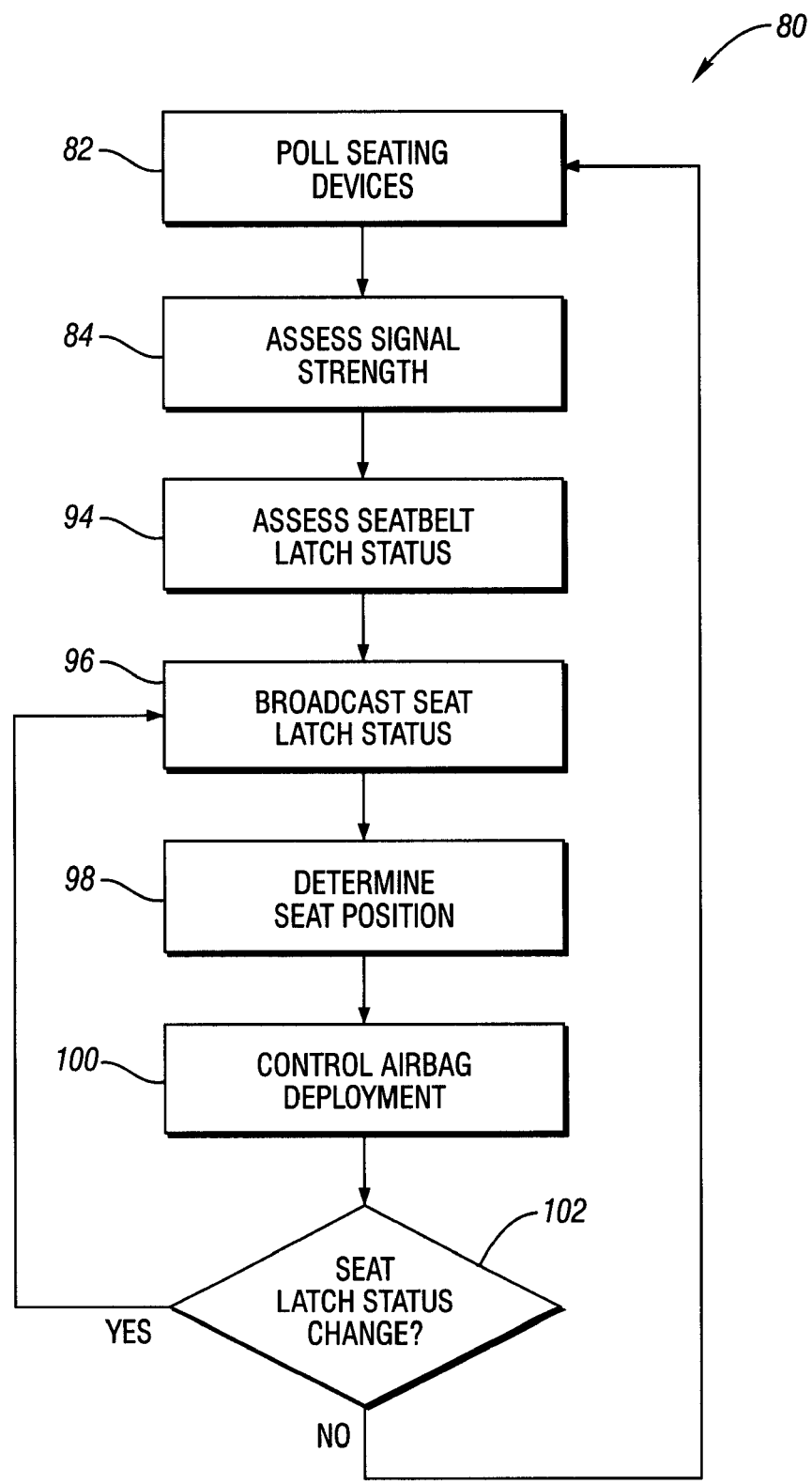
FIG. 2 illustrates a flowchart of a method for determining seat positioning in accordance with one non-limiting aspect of the present invention.

FIG. 2 illustrates a flowchart 80 of a method for determining seat positioning in accordance with one non-limiting aspect of the present invention. The method is predominately described with respect to determining seat positioning for seats included within a vehicle, however, the present invention is not intended to be so limited and fully contemplates its use in any other environment and not just vehicles.

Block 82 relates to polling the seating devices. The polling may include the base stations broadcasting a polling signals to the seating devices. The seating devices, or at least those located within the vehicle or the range of the broadcast signal, may commonly received the same polling signals. The polling signal may operate in conjunction with Block to wake up the seating devices receiving the polling signal. The polling signal may be broadcasted a low frequency signal to facilitate conservation of the battery included with the seating devices.

Block 84 relates to the seating devices assessing a signal strength of the received polling signal. The signal strength assessment corresponds with any assessment suitable for assessing a distance of the seating device from the low frequency antenna of the base station. Referring to FIG. 1, the low frequency base station antenna may be located closer a first one of the seating devices and successively farther from a second and third on of the seating devices. The reference lines 86, 88, 90 may be used to indicate the distance traveled by the polling signal from the low frequency antenna to reach of the seating devices. A received signal strength indication (RSSI) calculation or other suitable calculation may be performed by the microcontrollers to facilitate determining the signal strength of the received polling signal, i.e., the distance of the reference line between each seating device and the antenna. The distance determined from the signal strength may then be compared against the distances of the known seating areas to the antenna in order to facilitate determining seat positioning.

Block 94 relates to the seating devices assessing whether the associated seat belt latches are locked or unlocked. This step may also include the microprocessors performing other analysis associated with determining whether an occupant is in the seat and/or if other safety system found on or moveable with each seat are suitably armed or otherwise enabled to restrain a seat occupant.

Block 96 relates to transmitting a seat latch signal from each of the seating devices receiving the polling signal. The seat latch signals may be transmitted with the high frequency antennas and transmitters included on each seating device to conserve battery energy. The seat latch signals may include the signal strength information and seat latch status information determined in the preceding steps. The seat latch signals may further include an identifier to identifying each seat. The identifier may be a unique reference separately assigned to each registered seat that can be used to distinguish the seats from each other.

Block 98 relates to determining seat positioning upon receipt of the seat latch signals. The seat positioning may be determined by the base station as function of the signal strength information included within the seat latch signals. The seat positioning determinations may also include analyzing the identification information included within the seat latch signals so that not only the presence of a seat within each of the areas can be determined but so that the identity of each seat can also be determined. Optionally, the seat positioning may also include assessing the seat belt latch status information included within the seat latch signals for use in assessing whether an occupant is occupying the seat, assuming the occupant has properly engaged the seat safety system.

Block 100 relates to controlling an airbag deployment system or other vehicle system based on the information determined above. The present invention contemplates at least one application where deployment of one or more airbags may be controlled based on the presence of a seat within area within which an airbag deploys and/or whether an occupant within an determined seat has properly engaged the seat safety system, i.e., based on whether the occupant has locked their seat belt.

The airbag deployment system may include any number of airbags configured to deploy to one or more areas within the vehicle. The airbag deployment system may include three airbags for separately deploying to each of the three seating positions shown in FIG. 1. The present invention can selectively control which one or more of the airbags are enabled for deployment based on whether the corresponding seat position includes a seat, the identity of the seat within the corresponding seat position, the seat belt latch status, and/or some combination thereof.

Block 102 relates to determining a status change in the seat belt latch status. The seat devices may be configured to monitor for unlocking of the seat belt latch or other changes in operation when systems are operating based on the previously occurring status. If, for example, an occupant is in the seat and the seat belt latch is subsequently unlocked after being locked, and the airbag system is operation based on an occupant being the seat, Block 96 may be returned to for changing the control of the airbag deployment system.

If there is no significant change in any one of the seat devices that would warrant adjusting operation of one of the vehicle systems or that would require performing other analysis, Block 82 may be returned to for re-polling the seating devices. The re-polling of the seating devices may be used to re-assess the seating position, such as to re-check seating positioning after the vehicle is re-started or after another event or time delay.

As described above, one non-limiting aspect of the present invention relates to a concept for a vehicle electrical system to be able to identify if seat belts located in a second or third row seats are present and if the belts are latched. Since seats are removable, some seats may not be present in the vehicle. Latched seatbelts may be used to indicate that the seat is occupied and in the vehicle. The means of communicating this information between the seat (seatbelt buckle) and the vehicle electrical system may be through a half-duplex RF link comprised of the base station and seating devices. Optionally, the seating devices can be mated with one base station and may be required to remain in RF range of the base station in order to be recognized and to function as part of the system. Short RF broadcasts may limit the amount of power being consumed from a replaceable battery located with the seating device conserving battery life beyond 5-7 years.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling airbag deployment of an airbag deployment system included within a vehicle, the method comprising:
   broadcasting a polling signal from an antenna included within the vehicle;
   receiving the polling signal with a first seat belt latch device included within a first seat;
   only upon receipt of the polling signal, the first seat belt latch device broadcasting a first seat belt latch signal indicating whether a first seat belt latch included on the first seat is locked or unlocked;
   preventing airbag deployment if the first seat belt latch signal indicates the first seat belt latch is unlocked;
   receiving the polling signal with a second seat belt latch device included within a second seat, only upon receipt of the polling signal, the second seat belt latch device broadcasting a second seat belt latch signal indicating whether a second seat belt latch included on the second seat is locked or unlocked, and preventing airbag deployment if the second seat belt latch signal indicates the second seat belt latch is unlocked;
   wherein the airbag deployment system includes at least a first airbag configured for deploying to a first area within the vehicle; and
   preventing deployment of the first air bag to the first area if either of the first and second seats is determined to be positioned within the first area with the associated seat belt latch unlocked.

2. The method of claim 1 further comprising determining whether the first or second seat is within the first area as a function of a signal strength of the polling signal received by the first or second seat belt latch device.

3. The method of claim 1 further comprising determining whether the first or second seat is within the first area as a function of a signal strength of the broadcasted first or second seat belt latch signal.

4. The method of claim 1 further comprising deploying the first airbag to the first area if the first seat is located within the first area with the first seat belt latch locked and preventing deployment of the first airbag to the first area if the second seat is located within the first area with the second seat belt latch locked.

5. The method of claim 4 wherein the airbag deployment system includes at least a second airbag configured for deploying to a second area within the vehicle, the method further comprising determining whether the first or second seat is within the second area of the vehicle and deploying the second airbag to the second area if the second seat is located within the second area with the second seat belt latch locked and preventing deployment of the second airbag to the second area if the first seat is located within the second area with the first seat belt latch locked.

6. The method of claim 5 further comprising including identifiers within each of the first and second seat belt latch signals for use identifying whether the first and second seat are associated with the first and second seat belt latch signals.

7. The method of claim 1 further comprising attaching the first and second seat belt latch devices to the first and second seats such that the first and second seat belt latch devices are removable from the vehicle if the first or second seats are removed from the vehicle.

8. The method of claim 1 further comprising powering the first seat belt latch device with non-rechargeable batteries.

9. The method of claim 1 further comprising broadcasting the first seat belt latch signal at a higher frequency than the polling signal to conserve battery life during transmission and receiving operations performed by the first seat belt latch device.

10. A method for detecting seat position within a vehicle having at least first and second seat positions, the seat positions corresponding with different areas within the vehicle, the method comprising:
    broadcasting a first signal from a first device attached to a first seat;
    receiving the first signal with an antenna included within the vehicle; and
    determining whether the first seat is in the first or second position based on the first signal indicating signal strength of the first device relative to the antenna.

11. The method of claim 10 further comprising broadcasting a second signal from a second device attached to a second seat and determining whether the second seat is in the first or second position based on the second signal indicating signal strength of the second device relative to the antenna.

12. The method of claim 11 further comprising the first and second devices calculating signal strength for a polling signal broadcast from the antenna and each of the first and second devices indicating the calculated signal strength within the first and second signals broadcasted to the antenna for use in determining whether the first seat is in the first or second position.

13. The method of claim 12 further comprising controlling deployment of an airbag deployment system as a function of whether the first and second seats are in the first or second positions.

14. The method of claim 11 further comprising locating the antenna closer to the first position than the second position such that the seat closest to the antenna has the greatest signal strength, and determining the first seat to be in the first position if the signal strength of the first signal is greater than the signal strength of the second signal and determining the second seat to be in the first position if the signal strength of the second signal is greater than the signal strength of the first signal.

15. The method of claim 11 further comprising broadcasting the first and second signals without connecting the first and second devices to a vehicle based power system.

16. A system for detecting seat position within a vehicle having at least first and second seat positions, the seat positions corresponding with different areas within the vehicle, the system comprising:
a device attached to a seat for broadcasting a signal;
a processor configured for determining whether the seat is in the first or second position based on the signal indicating signal strength of the device; and
an antenna for receiving the signal, the antenna being located closer to the first position than the second position, the signal having a lower signal strength when associated with the second position than the first position, the processor determining the seat to be in the first or second position based on whether the signal indicates the lower signal strength associated with the seat broadcasting from the second position.

17. The system of claim 16 wherein the device determines the signal strength as a function of a polling signal broadcasted from the antenna at a lower frequency than the device transmits the signal to the antenna in order to conserve battery life during transmission and receiving operations performed by the device.

* * * * *